(12) United States Patent
Ghobrial et al.

(10) Patent No.: US 7,210,126 B2
(45) Date of Patent: Apr. 24, 2007

(54) USING IDENTIFIERS AND COUNTERS FOR CONTROLLED OPTIMIZATION COMPILATION

(75) Inventors: Shereen M. Ghobrial, Toronto (CA); John D. Keenleyside, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 10/216,619

(22) Filed: Aug. 8, 2002

(65) Prior Publication Data

US 2003/0079214 A1 Apr. 24, 2003

(30) Foreign Application Priority Data

Oct. 24, 2001 (CA) .................................. 2359862

(51) Int. Cl.
*G06F 9/44* (2006.01)
*G06F 9/445* (2006.01)

(52) U.S. Cl. .................... 717/127; 717/140; 717/151

(58) Field of Classification Search ........ 717/124–143, 717/145–148, 150–152
See application file for complete search history.

(56) References Cited

U.S. PATENT DOCUMENTS

| | | | | |
|---|---|---|---|---|
| 5,175,856 A | * | 12/1992 | Van Dyke et al. | 717/151 |
| 5,179,702 A | * | 1/1993 | Spix et al. | 718/102 |
| 5,701,489 A | * | 12/1997 | Bates et al. | 717/157 |
| 5,761,513 A | * | 6/1998 | Yellin et al. | 717/127 |
| 5,797,012 A | | 8/1998 | Blainey et al. | |

(Continued)

FOREIGN PATENT DOCUMENTS

WO WO 99/46677 9/1999

(Continued)

OTHER PUBLICATIONS

Brewer, "High level optimization via automated statistcial modeling" ACM PPOPP pp. 80-91, 1995.*

(Continued)

*Primary Examiner*—Anil Khatri
(74) *Attorney, Agent, or Firm*—Just Dillon; Leslie A. Van Leeuwen (57) ABSTRACT

The invention enables a compiler (during its first compilation pass) to insert identifiers during an early optimization phase into machine-independent code. The identifiers are used for identifying specific instructions of the machine-independent code. The compiler may use a table to record the assignment of identifiers and their corresponding portion of machine-independent code. During subsequent optimization phases of the first compilation pass, portions of machine-independent code are transformed into portions of machine-dependent code, and the machine-dependent code inherits identification associated with the portions of machine-independent code that were used to generate the portions of machine-dependent code. After the first compilation pass, executable code is made to interact with test data to generate statistical execution data which is collected by previously inserted counters. The collected counter data is consolidated so that it relates to the instructions of the machine-independent code. During a second compilation pass of the compiler, the compiler reads the machine-independent code, the collected or captured counter data, an indication of the association between the identifiers and the instructions (which can be stored in a table). Subsequently, the compiler begins locating instructions of the machine-independent code relative to other instructions of the machine-independent code during an early or first optimization phase of the second compilation pass.

20 Claims, 9 Drawing Sheets

U.S. PATENT DOCUMENTS

| | | | |
|---|---|---|---|
| 5,881,262 A | 3/1999 | Abramson et al. | |
| 5,901,308 A | 5/1999 | Cohn et al. | |
| 5,923,863 A | 7/1999 | Adler et al. | |
| 5,960,198 A | 9/1999 | Roediger et al. | |
| 5,978,588 A | 11/1999 | Wallace | |
| 5,999,738 A | 12/1999 | Schlansker et al. | |
| 6,151,706 A | 11/2000 | Lo et al. | |
| 6,240,548 B1* | 5/2001 | Holzle et al. | 717/140 |
| 6,463,582 B1* | 10/2002 | Lethin et al. | 717/158 |
| 6,594,820 B1* | 7/2003 | Ungar | 717/124 |
| 6,606,742 B1* | 8/2003 | Orton et al. | 717/140 |
| 6,643,842 B2* | 11/2003 | Angel et al. | 717/130 |
| 6,675,375 B1* | 1/2004 | Czajkowski | 717/151 |
| 6,763,452 B1* | 7/2004 | Hohensee et al. | 712/227 |
| 6,789,181 B1* | 9/2004 | Yates et al. | 712/4 |
| 6,795,962 B1* | 9/2004 | Hanson | 717/129 |
| 6,826,748 B1* | 11/2004 | Hohensee et al. | 717/130 |
| 6,981,246 B2* | 12/2005 | Dunn | 717/127 |

FOREIGN PATENT DOCUMENTS

| | | |
|---|---|---|
| WO | WO 00/49499 | 8/2000 |

OTHER PUBLICATIONS

Rashid et al, "Machine independent virtual memory management for paged uniprocessor and multiprocessor architectures", ACM pp. 31-39, 1987.*

Gil et al, "Micro patterns in Jave code", ACM OOPSLA, pp. 97-116, 2005.*

Krintz, "Coupling online and off line profile information to improve program performance", IEEE, pp. 69-78, 2003.*

IEEE, International Symposium on Microarchitecture, 30th Annual, Dec. 1-3, 1997, Proceedings for MICRO-30th, "Evaluation of Scheduling Techniques on a SPARC-based VLIW Testbed" by Seongbae Park et al, pp. 104-113.

ACM, SIGPLAN Notice Conference Jun. 22-24, 1994, VLIW Compilation Techniques in a Superscalar Environment, by K. Ebcioglu et al , vol. 29, No. 6, pp. 36-48.

Dr. Dobb's Journal, May 1998, Programmers Toolchest, "Profile-guided Optimizations" by G. Carleton et al, vol. 23, No. 5, pp. 98, 100-103.

* cited by examiner

USING IDENTIFIERS AND COUNTERS FOR CONTROLLED OPTIMIZATION COMPILATION

FIELD OF THE INVENTION

The invention relates to compiling source code, and more specifically compiling source code using profile directed feedback in combination with identifiers of programmed instructions.

BACKGROUND

Figure 1:
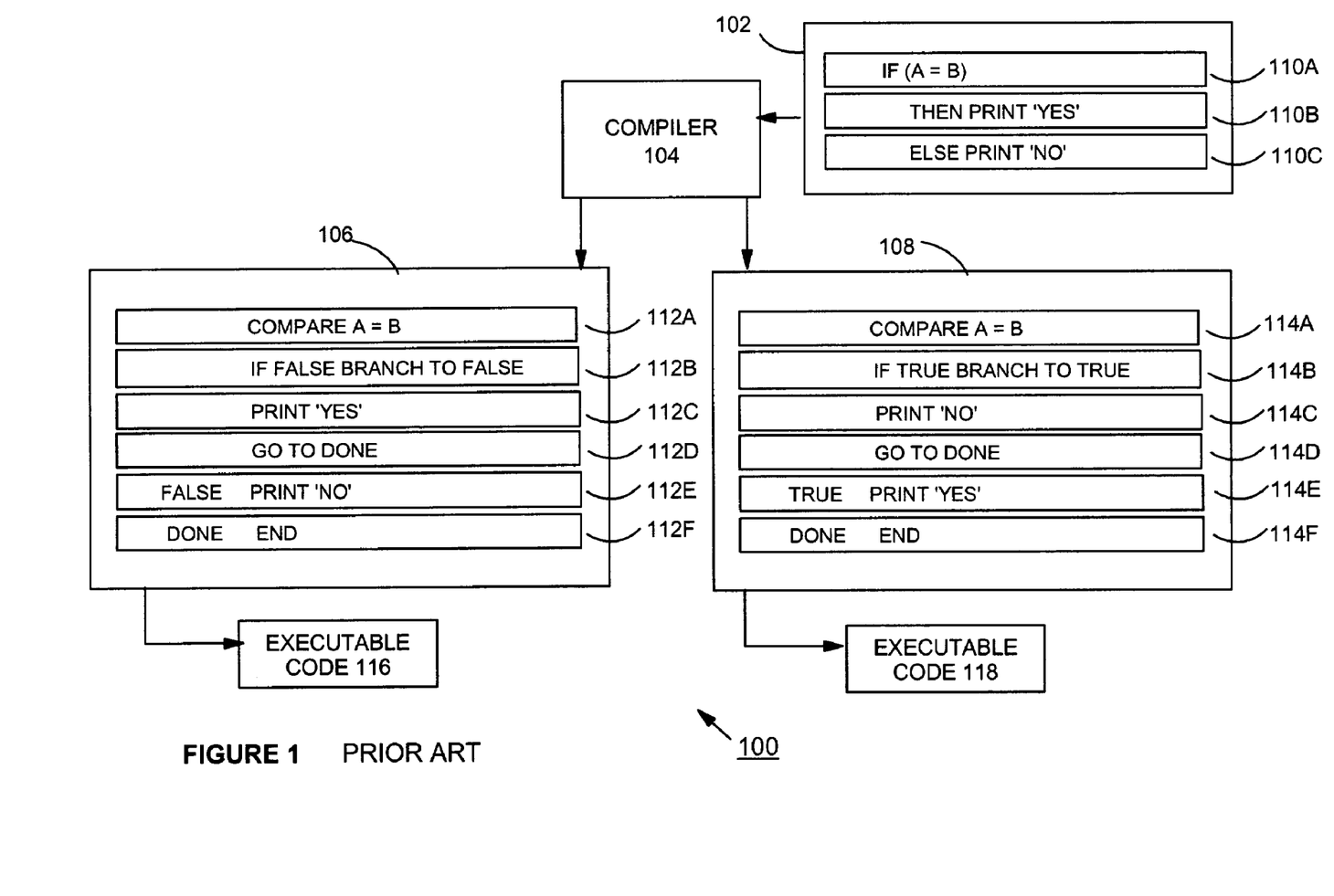
FIG. 1 depicts a prior art compilation environment.

Referring to FIG. 1, there is depicted a compilation environment 100 including source code 102, compiler 104, assembler code 106 or 108, and respective executable code 116 or 118. Compiler 104 compiles source code 102 to generate either assembler code 106 or 108 depending upon optimization routines used by compiler 104. Source code 102 includes computer programmed instructions written in a computer programming language such as Java, C++ or FORTRAN. Source code 102 is machine independent, which means that the source code includes generic programmed instructions 110A, 110B, 110C which are not yet in a form that is executable by any specific Central Processing Unit (CPU). Advantageously, compiler 104 compiles source code 102 to generate assembler code 106 or 108 which is executable by a specific type of CPU (sometimes referred to as a machine). Compiler 104 generates either assembler code 106 or 108 depending on the programmed instructions of the optimization routines used by compiler 104 when compiler 104 optimizes the instructions included in source code 102.

Compiler 104 performs several optimization phases to achieve several objectives. During the optimization phases, the instructions of source code 102 are replaced with machine-level instructions that are executable by a specific CPU and the machine-level instructions are repositioned, shuffled, or relocated with respect to other machine-level instructions in an attempt to produce executable code which is capable of being, for example, quickly executed or to produce minimized file size of the executable code for reducing dependency on computer memory (or a combination of both). After machine-level code 106 or 108 (sometimes referred to as assembler code) is generated, compiler 104 completes its task by generating a respective machine-executable code 116 or 118.

Assembler code 106 includes assembler-level computer instructions 112A to 112F that are machine dependent which means the assembler-level instructions can instruct a specific type of CPU. Compiler 104 uses the assembler code 106 to generate executable code 116 that can be executed. When compiler 104 uses one type of optimization routine, code 106 is generated having instructions 112A to 112F ordered or placed in the sequence depicted in FIG. 1. When compiler 104 uses another type of optimization routine, code 108 is generated having instructions 114A to 114F ordered or placed in the sequence depicted in FIG. 1 which is a different sequence of instructions when compared to code 106.

Executable code 116 includes an arrangement of contiguous portions (not depicted) corresponding to executable code of the assembler-level instructions 112A to 112F. The arrangement of the contiguous portions of executable code cannot be rearranged once the executable code 116 is generated by compiler 104. For the case when instruction 112C is executed more frequently than instruction 112E, it is advantageous to position or place instruction 112C in an execution fall through path immediately after instruction 112B, and to place instruction 112E offset from instruction 112B because execution time is not wasted in performing a branching operation for an instruction having a very high possibility (statistically) of being executed. However, for the case where instruction 112E is executed more frequently than instruction 112C, then it would be advantageous to position instruction 112E in the fall through path immediately after instruction 112B (which is the desirable ordering as depicted in code 108), and instruction 112C is placed offset from instruction 112B.

It will be appreciated that if code 106 were to be executed for the second case, then disadvantageously the execution fall through path proceeds, jumps, or branches from instruction 112B to instruction 112E on a frequent basis which will then require additional CPU processing time. It is a known problem that CPUs require extra time when executing branching instructions. For the second case, it would be highly desirable to place instruction 112E in an position adjacent to instruction 112B and locating instruction 112C offset from instruction 112B. It will be appreciated that code 108 is the preferred code for the second case, and code 106 is the preferred code for the first case. It is desirable to avoid spending time performing branching instructions whenever possible.

During optimization phases of a compiler, the compiler changes or transforms machine-independent code (also known as high-level code) into machine-dependent code (also known as low-level code or assemble code). From an optimization phase to a subsequent optimization phase, the compiler attempts to relocate or position units of transformed code relative to other units of transformed code by following known optimization algorithms. Transformed code is also known as intermediate representation (IR) code.

For a compilation pass of a compiler, the compiler reads machine-independent code and generates computer-executable, machine-dependent code via a series of optimization phases. During a first optimization phase of the compiler, profile directed feedback (PDF) counters (also known generically as 'counters') are inserted into machine-dependent code generated or created during a later or last optimization phase. Executable code, generated as a result of completing the first optimization pass, is made to interact with test data to subsequently generate statistical execution data which is captured by the inserted counters. It will be appreciated that the statistical execution data is related to the machine-dependent code that was formed during the latter or last optimization phase.

During a second compilation pass of the compiler, the compiler reads the machine-independent code and the captured counter data, optimizes the code during its optimization phases, and uses the captured counter data to specifically optimize code during the latter or last optimization phase. The captured counter data relates to the machine-dependent code (and is not related to the machine-independent code). An improved optimizing compiler is desired.

SUMMARY OF THE INVENTION

The present invention provides a mechanism for enabling a compiler during a first pass of optimization phases of the compiler to compile instructions included in code by inserting identifiers associated with each instruction into the code during an initial or early and optimization phase of a compiler and then inserting counters into the code during a later or final optimization phase. The compiler generates executable code which is then made to interact with test data so that the counters can collect statistical execution data (e.g., how frequently portions of executable code was executed when the executable code interacted with the test data). During a second pass of optimization routines of the compiler, the instructions included in the code are optimized by using the collected statistical execution data.

Advantageously, the present invention permits a compiler (during its first compilation pass) to insert identifiers during an early or first optimization phase into machine-independent code. The identifiers are used for identifying specific instructions (or groups of instructions) of the machine-independent code. The compiler may use a table to record the assignment of identifiers and their corresponding portion of machine-independent code. During subsequent optimization phases (of the first compilation pass) portions of machine-independent code are changed, modified, or transformed into portions of machine-dependent code (or IR code), and the machine-dependent code will inherit the identification (e.g., the identifiers) associated with or corresponding to the portions of machine-independent code that were used to generate or propagate the portions of machine-dependent code. If a single instruction of the machine-independent code is propagated by the compiler to generate two or more instructions of the machine-dependent code, the generated instructions of the machine-dependent code will inherit the identification associated with the single instruction of the machine-independent code. If two or more instructions of the machine-dependent code are combined by the compiler into a single instruction of machine-dependent code, then the generated single instruction of the machine-dependent code will inherit the identification associated with all of the instructions of the machine-independent code. Counters are then inserted into the machine-dependent code during a later or last optimization phase. The compiler then generates computer executable code having identifiers and counters inserted or embedded into the executable code.

The executable code is made to interact with test data to generate statistical execution data which is collected by the counters. The collected counter data is consolidated so that it relates to the identifiers so that, ultimately, the collected counter data is related to the instructions of the machine-independent code.

Advantageously, during a second compilation pass of the compiler, the compiler reads the machine-independent code, the collected or captured counter data and an indication of the association between the identifiers and the instructions (such as a table). A convenient mechanism for associating identifiers with instructions can be a table or a database. Subsequently, the compiler begins locating or optimizing placement of instructions of the machine-independent code relative to other instructions of the machine-independent code during an early or first optimization phase. Advantageously, this affords more opportunities to relocate code during subsequent optimization phases in contrast to being limited by the prior art to having to relocate code in a last optimization based on collected statistical execution data.

In a first aspect of the invention, there is provided a counter for counting frequency of execution of units of code, the counter including a mechanism for counting frequency of execution of a unit of optimized code derived from one of the units of code, the mechanism associated with inheriting identification of the one of the units of code.

In a further aspect of the invention, there is provided a counter for counting frequency of execution of units of machine-independent code, the counter including a mechanism for counting frequency of execution of a unit of optimized code derived from one of the units of machine-independent code, the mechanism associated with inheriting identification of the one of the units of machine-independent code.

In a further aspect of the invention, there is provided a counter including a mechanism for counting frequency of execution of a unit of optimized code derived from one or more units of code wherein the mechanism is associated with identifiers associated with each of the one or more units of code.

In a further aspect of the invention, there is provided a compiler for compiling code to generate statistically optimized code, the code having a unit of code, the compiler including means for a unit of optimized code derived from the unit of code inheriting identification of identified the unit of code, and means for optimizing the code based on statistical execution data to generate statistically optimized code, the statistical execution data related to inherited identification of identified the unit of code.

In a further aspect of the invention, there is provided a method for compiling code to generate statistically optimized code, the code having a unit of code, the method including a unit of optimized code derived from the unit of code inheriting identification of identified the unit of code, and optimizing the code based on statistical execution data to generate statistically optimized code, the statistical execution data related to inherited identification of identified the unit of code.

In a further aspect of the invention, there is provided a computer program product for use in a computer system operatively coupled to a computer readable memory, the computer program product including a computer-readable data storage medium tangibly embodying computer readable program instructions and data for directing the computer to compile code to generate statistically optimized code, the code having a unit of code, the computer program product including instructions and data for a unit of optimized code derived from the unit of code inheriting identification of identified the unit of code, and instructions and data for optimizing the code based on statistical execution data to generate statistically optimized code, the statistical execution data related to inherited identification of identified the unit of code.

A better understanding of these and other aspects of the invention can be obtained with reference to the following drawings and description of the preferred embodiments.

DESCRIPTION OF THE DRAWINGS

The embodiments of the present invention will be explained by way of the following drawings.

DESCRIPTION OF THE PREFERRED EMBODIMENTS

Figure 2:
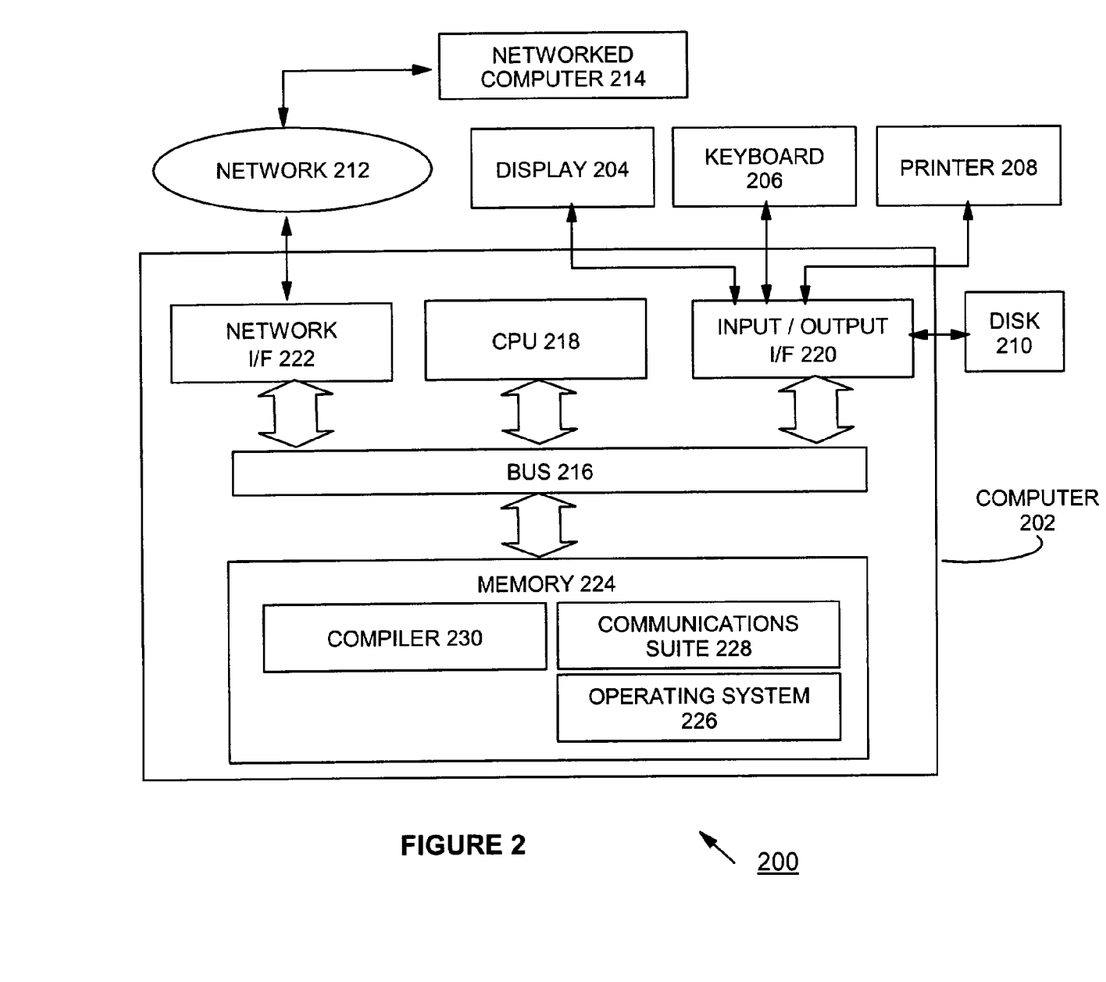
FIG. 2 depicts an embodiment of a computer system for use with a compiler embodying aspects of the invention.

Referring to FIG. 2, there is depicted a computing system 200 for operation with embodiments of the invention. A computer system 202 is operationally coupled to a networked computer 214 via suitable network connections to network 212. Network 212 is a conventional network such as a local area network, wide area network, intranet, Internet, and the like, or a convenient combination thereof. Network 212 provides a convenient mechanism for transporting data to and from the computer system 202. It will be appreciated that embodiments of the invention can operate with computer system 202 not connected to network 212, provided the data is entered directly to the memory of computer system 202 via a keyboard/mouse 206 or via a removable computer readable media, such as a floppy disk 210. Aspects of the embodiments of the invention can be distributed amongst various networked computers interacting with a computer system 202 via network 212 or a combination of networks. However, for convenient illustration and description of the embodiments of the invention, the embodiments will be implemented in computer system 202 (e.g., a single or self-contained computer). Computer system 202 operates with various output devices such as display terminal 204, printer 208, machine-dependent code, each of the generated instructions of the machine-dependent code will inherit the identification associated with the single instruction of the machine-independent code. network 212, and with various input devices, such as keyboard/mouse 206 and a disk 210. Other devices can include various computer peripheral devices, such as a scanner, CD-ROM drives, and the like.

Computer 202 includes a bus 216 that operationally interconnects various sub systems or components of the computer 202, such as a central processing unit (CPU) 218, a memory 224, a network interface (I/F) 222, and an input/output interface 220. In the exemplary embodiment, CPU 218 is a commercially available central processing unit suitable for operations described herein. Other variations of CPU 218 can include a plurality of CPUs. Suitable support circuits or components can be included for adapting the CPU 218 for optimum performance with the subsystems of computer 202.

Input/output (I/O) interface 220 enables communication between various subsystems of computer 202 and various input/output devices, such as keyboard/mouse 206. Input/output interface includes a video card for operational interfacing with display unit 204, and preferably a disk drive unit for reading suitable removable computer-readable media, such as a floppy disk 210, or CD.

Removable media 210 is a computer programmed product having programming instructions to be subsequently executed by CPU 218 to configure and enable system 202 to realize embodiments of the invention. Media 210 can provide removable data storage if desired.

Network interface 222, in combination with a communications suite 228, enables suitable communication between computer 202 and other computers operationally connected via network 212. Examples of a conventional network interface can include an Ethernet card, a token ring card, a modem, or the like. Optionally, network interface 222 may also enable retrieval of transmitted programmed instructions or data to subsequently configure and enable computer 202 to realize the embodiments of the invention. It will be appreciated that various aspects of the embodiments of the invention can be enabled in various computer systems operationally networked to form a distributed computing environment.

Figure 5A:
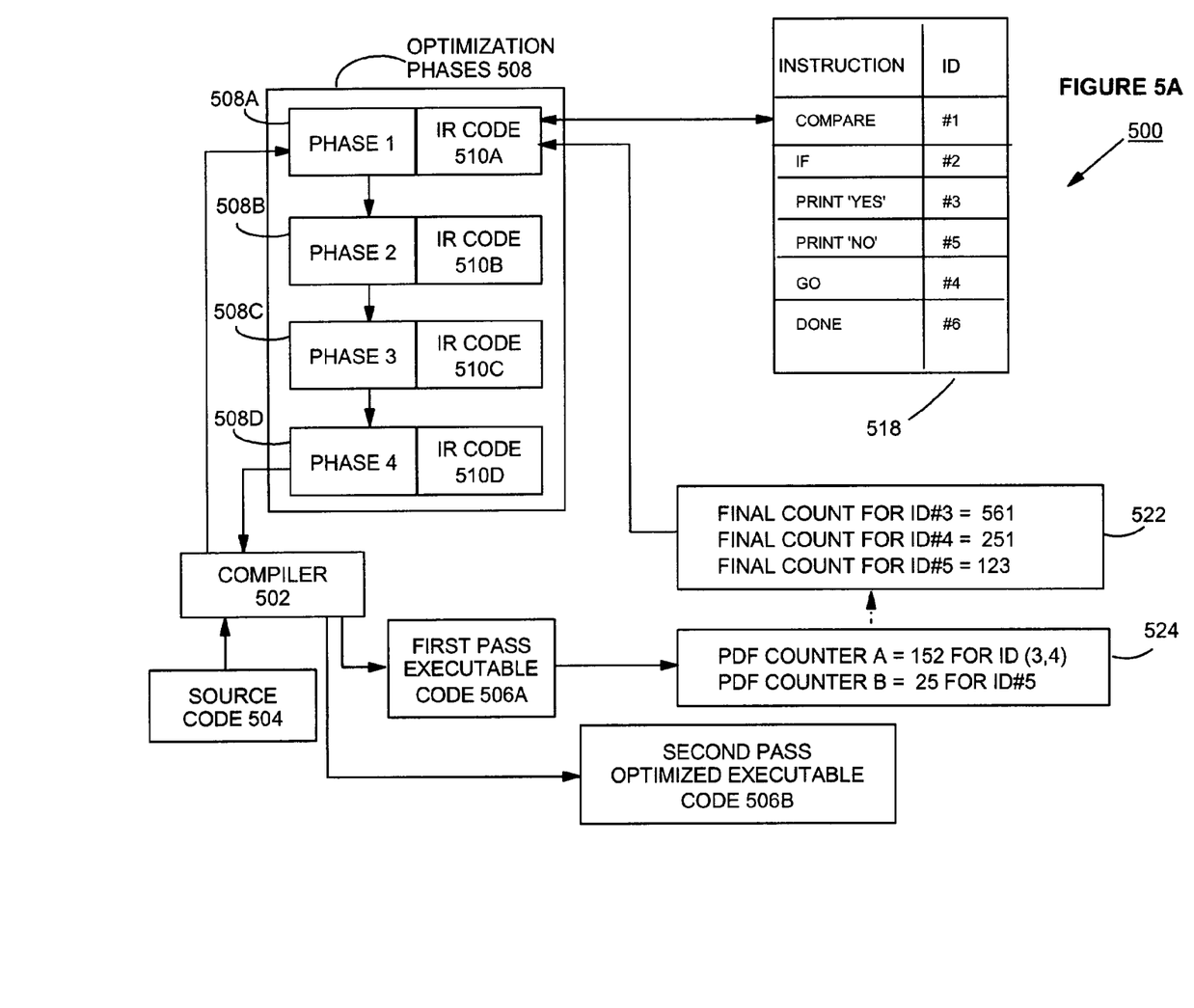
FIGS. 5A and 5B depict another compiler for use with the computer of FIG. 2.
Figure 7:
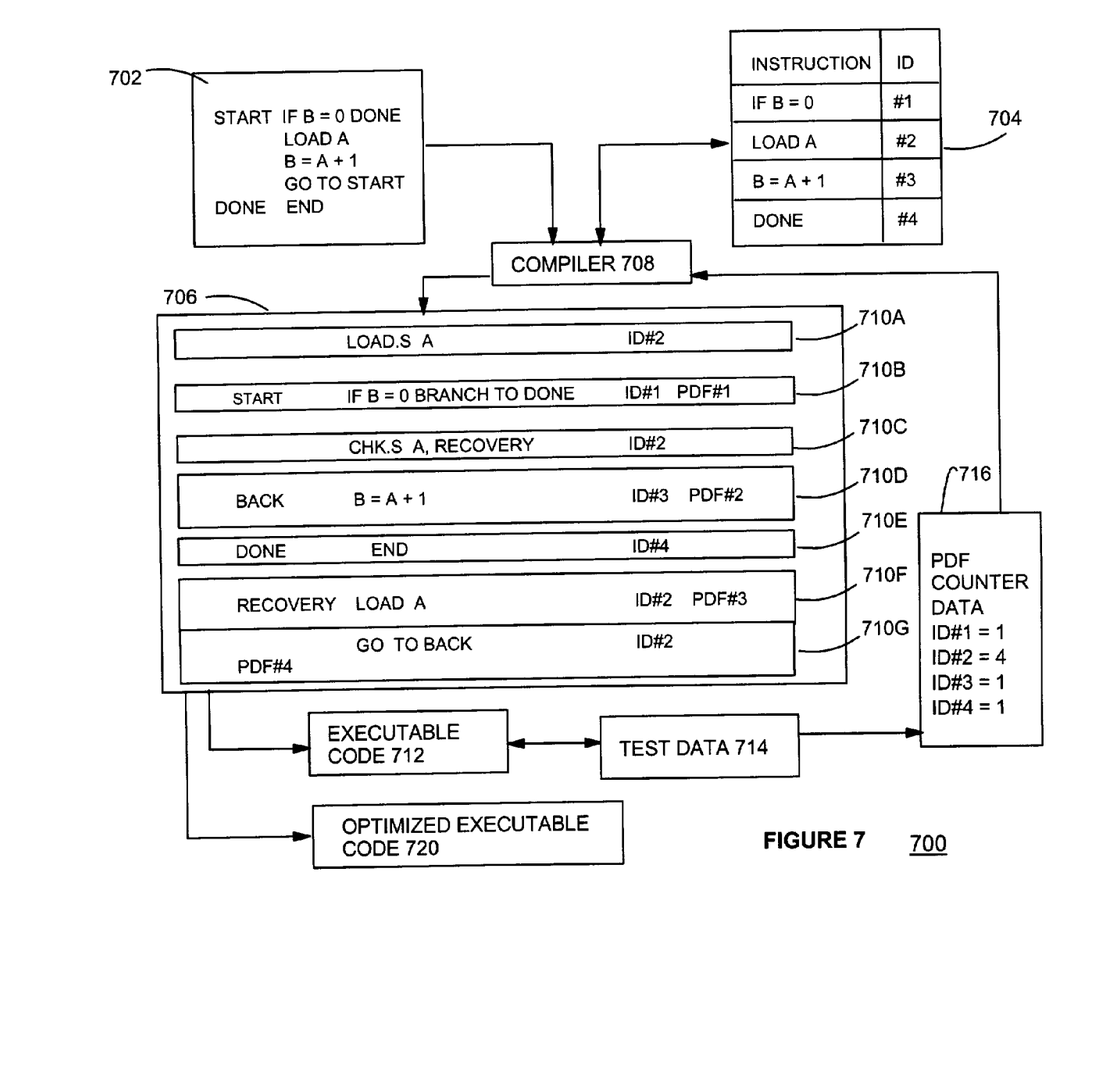
FIG. 7 depicts yet another compiler for use with the computer of FIG. 2.

Memory 224 is operationally coupled via bus 216 to CPU 218. Memory 224 includes volatile and persistent memory for storage of computer programmed instructions of the embodiments of the invention for instructing the CPU 218. Memory 224 also includes operating system 226 and communications suite 228. Preferably, memory 224 includes a combination of random access memory (RAM), read-only memory (ROM) and a hard disk storage device. It will be appreciated that programmed instructions of the embodiments of the invention can be delivered to memory 224 from an input/output device, such as a floppy disk 210 insertable into a floppy disk drive via input/output interface 220, or downloadable to memory 224 via network 212. Memory 224 also includes compiler 230 embodying aspects of the invention. Embodiments of compiler 230 are depicted in FIGS. 3, 5, and 7.

Operating system 226 cooperates with CPU 218 to enable various operational interfaces with various subsystems of computer 202, and provide various operational functions, such as multitasking chores and the like.

Communications suite 228 provides, through interaction with operating system 226 and network interface 222, suitable communications protocols to enable appropriate communications with networked computing devices via network 212, such as TCP/IP, ethernet, token ring, and the like.

Figure 3:
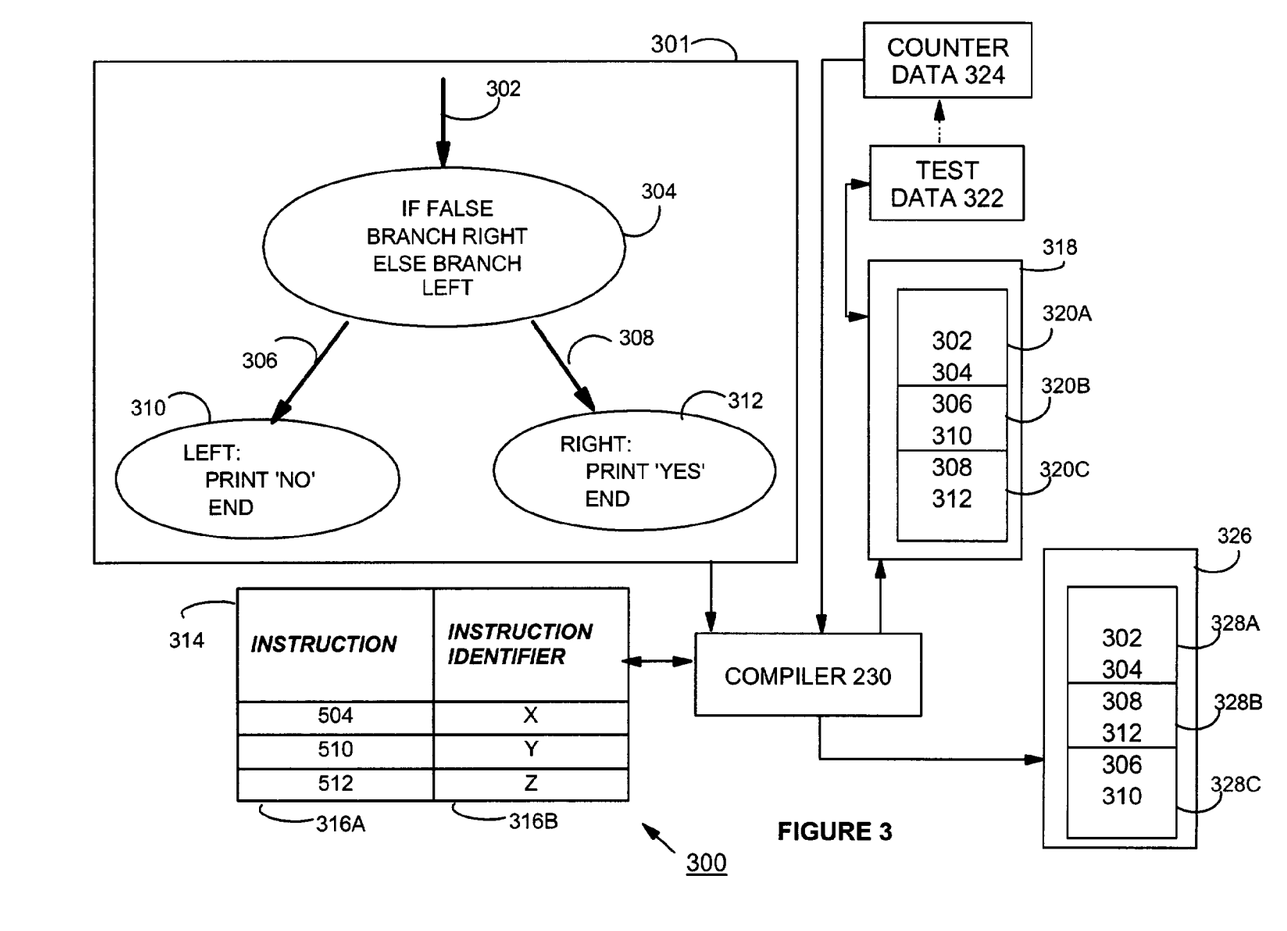
FIG. 3 depicts aspects of the compiler of FIG. 2.

Referring to FIG. 3, there is depicted a compilation environment 300 including compiler 230 of FIG. 2. Compilation environment 300 also includes source code 301 and executable code 318 and/or executable code 326. Compiler 230 compiles source code 301 to generate executable code 318 during a first compilation pass of compiler 230.

Code 301 includes execution path 302 which includes various computer programmed instructions. A single conditional branch instruction 304, such as an "IF" instruction, which terminates the execution path 302 is illustrated. Code 301 also includes first and second execution branch 306 and 308 which originate from the conditional branch instruction 304. Code 301 also includes first and second instructions 310, 312 which terminate respective execution branch paths 306, 308. Other execution paths (not depicted) may also form art of code 301.

Compiler 230 reads the instructions includes in code 301 and generates or populates a lookup table 314 with data about the instructions of code 301. The data of table 314 includes identifiers associated or corresponding with each instruction of code 301. In a preferred embodiment, all instructions of code 301 are each assigned a corresponding or respective identifier. In an alternative embodiment, only branching instructions included in code 301 are each assigned a respective identifier. Compiler 230 uses table 314 to record the identifiers and their corresponding assignment to an instruction. Compiler 230 also inserts the identifiers into code 301. The identifiers are used to identify portions of code or a group of instructions of the code. Preferably, the identifiers are inserted adjacent to its respective or corresponding instruction (as indicated in table 314). In a preferred embodiment, the identifiers are inserted during an early phase of optimization operation of compiler 230, and counters are inserted into optimized code during a later phase of optimization operation of compiler 230. The counters will be used to facilitate the collection of statistical execution data related to the units of optimized code when the units of optimized code are executed. During the various optimization phases, compiler 230 ensures that the optimized code will inherit identification of earlier identified code that was used for creating the code of subsequent optimization phases (described in greater detail below). Eventually, compiler 230 will complete its optimization phases and generate executable code 318.

Executable code 318 includes executable code portions 320A, 320B, and 320C. Executable code portion 320A includes executable code corresponding to the instructions of execution path 302 and branch instruction 304. Executable code portion 320B includes executable code corresponding to the instructions of execution path 306 and instruction 310. Executable code portion 320C includes executable code corresponding to the instructions of execution path 308 and instruction 312. Compiler 230 has positioned or located the code portions in the sequence depicted in FIG. 3. Executable code portion 320B is positioned or located adjacent to executable portion 320A in memory 224 (FIG. 2). As a result of compiler 230 using its optimization routines, executable code portion 320C is located offset from executable portion 320A (e.g., not adjacent or placed a certain distance apart from portion 320A). For the case when executable code portion 320A requires branching to executable code portion 320C, CPU 218 branches, jumps, or bypasses executable code portion 320B. The depicted positioning or ordering of the executable code portions 320A, 320B, and 320C would be desirable if code portion 320B is required to be frequently executed immediately after the execution of code portion 320A. If that is not the case, then code portion 320C is preferably located or placed immediately adjacent to code portion 320A so that code portion 320B is located offset from code portion 320A. The determination of where to locate (in memory) executable code portions will be explained in the operations depicted in FIG. 4.

As noted above, during various optimization phases and as portions of machine-independent code are changed, modified, or transformed into portions of machine-dependent code (or IR code), the machine-dependent code will inherit the identification (e.g., the identifiers) associated with or corresponding to the portions of machine-independent code that were used to generate or propagate the portions of machine-dependent code. If a single instruction of the machine-independent code is used by the compiler to generate two or more instructions of the machine-dependent code, the generated instructions of the machine-dependent code will inherit the identification associated with the single instruction of the machine-independent code. If two or more instructions of the machine-dependent code are propagated by the compiler to combine the instructions into a single instruction of machine-dependent code, then the generated single instruction of the machine-dependent code will inherit the identifiers associated with each of the instructions of the machine-independent code. In this sense, the identifiers are also propagated.

Code 301 is made to interact with test data 322, in which the inserted counters will count the frequency of execution of portions of code. Once the interaction with test data is completed, compiler 230 can be directed to recompile code 301 and use the collected counter data 324 to optimize portions of code 301. The counter data is associated with the identifiers of table 314 and compiler 230 can make decisions about the placement or location of code depending on the statistical execution data contained in the counter data 324.

It is understood that a compiler performs optimization by placing instructions in desired positions relative to other instructions. It will be appreciated that some operating system will fragment code into code portions and store the code portions at various positions in computer readable media in a manner that is not controlled or influenced by the compiler. The manner in which a computer system stores code portions in memory is another matter which is beyond the scope of this invention. Since some operating systems will split the code into code portions, the instructions of the code portions will no longer be placed or positioned in the manner that the compiler had generated. For the case when a computer system splits code into code portions, the CPU of the computer system will need to perform branching to interconnect the code portions (even for instructions that were placed 'logically' adjacent to other instructions by the compiler).

Figure 4:
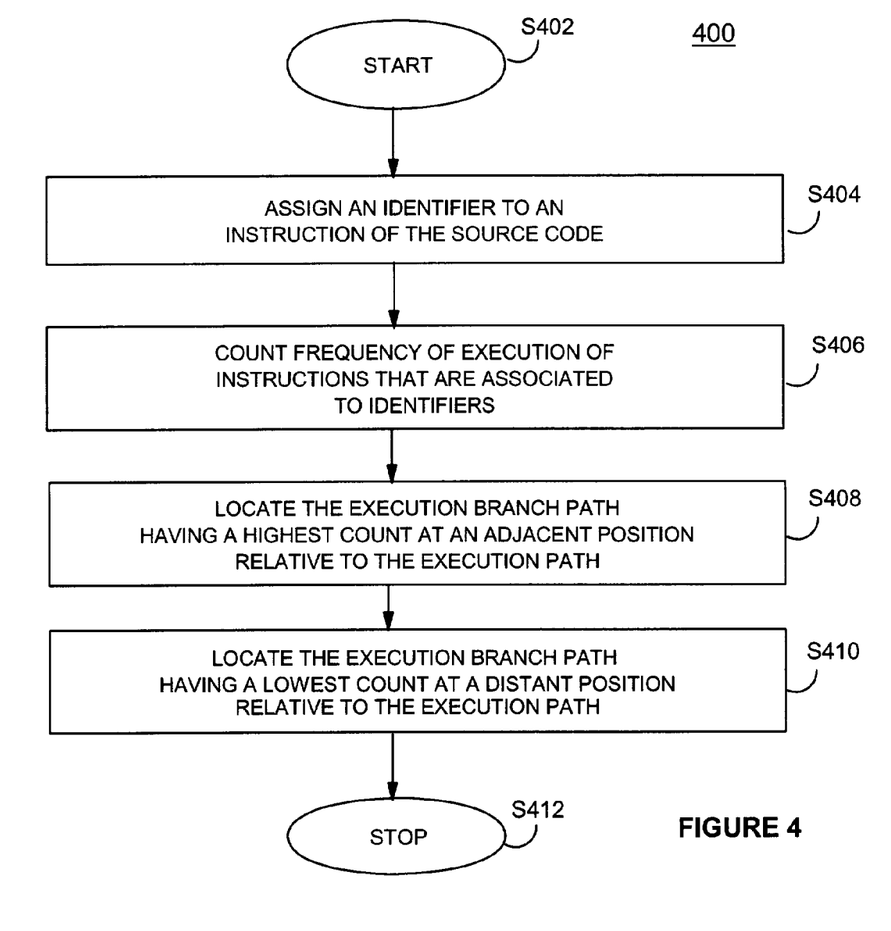
FIG. 4 depicts operations of the compiler of FIG. 3.

Referring to FIG. 4, there is depicted operations of the compiler 230 of FIG. 3. It is understood that the operations depicted in flowchart 400 will be performed by compiler 230 unless otherwise stated. Operations depicted in FIG. 4 will assist compiler 230 in determining the appropriate location or placement of executable code portions 320B and 320C relative to executable code portion 320A.

When compiler 230 is ready, S402 indicates the start of the operations of compiler 230. In S404, during a first compilation pass, compiler 230 reads source code 301 and identifies all branch instructions, such as instruction 304, and other instructions which depend from the branching instructions, such as instructions 310 and 312. It will be appreciated that either: all or some of the instructions of code 301 are identified; or some or all of the branching instructions are identified. Once the instructions are identified, compiler 230 assigns or associates an identifier with each identified instruction of the source code. Compiler 230 uses a lookup table 314 or a suitable database to store the identifiers (e.g., X, Y, Z) and the corresponding identified instructions (e.g., instructions 304, 310 and 312 respectively). Preferably, the assignment of identifiers to instructions is conducted during an initial optimization phase. During a subsequent optimization phase, compiler 230 inserts counters into the optimized code. Preferably, the insertion of the counters is performed during the last optimization phase of compiler 318 (the inserted counters are not depicted in code 318). There are known techniques for inserting counters, such as profile directed feedback counters known to persons having ordinary skill in the art. Once compiler 230 generates executable code 316, executable code 316 is made to interact with test data 326, and the interaction of test data 326 with code 316 (having inserted counters) will cause the inserted counters to generate and accumulate counter data 324 (that indicates statistical execution data). The interaction of the test data with the inserted counter data is well understood by persons having ordinary skill in the art. In S406, the counters count the frequency of execution of portions of code 230 while code 230 interacts with test data 322 to generate counter data 324. It will be appreciated that test data 322 includes data which code 230 will be most likely to encounter in typical scenarios. The accumulated counter data 324 will be used by compiler 318 in a second compilation pass. In the second pass, compiler 230 will use the data 324 to generate optimized executable code.

A counter for use with compiler 230 is used for counting frequency of execution of units of code. The counter is a mechanism for counting frequency of execution of a unit of optimized code derived from at least one of the units of code. During optimization of the code, the unit of optimized code inherits identification of the previously identified units of code. In a preferred embodiment, the counter associates the frequency of execution of the unit of optimized code to the unit of source code from which the optimized code was wholly or partially derived.

During a second compilation pass, compiler 230 reads source code 301, the counter data 328, and table 314 and begins optimization of code 301. In S408, compiler 230 locates the instruction having the highest count (e.g., as provided by statistical execution data) adjacent to the branch instruction. In S410, compiler 230 locates the instruction having the lowest count (such as instruction 312 of code 318) and places the instruction offset from (e.g., positioned or placed further away from) the branch instruction (such as instruction 304 of code 318). For example, if the counter data of instruction 310 is greater than the counter data of instruction 312, then compiler 230 will generate executable code having the order illustrated by executable code 318 during a second compilation pass. If the counter data of instruction 312 is greater than the counter data of instruction 310, then compiler 230 will generate executable code 326 (where code 312 is placed in a higher priority position than code 310) during a second compilation pass. In S412, compiler 230 stops it compilation process.

Figure 5B:
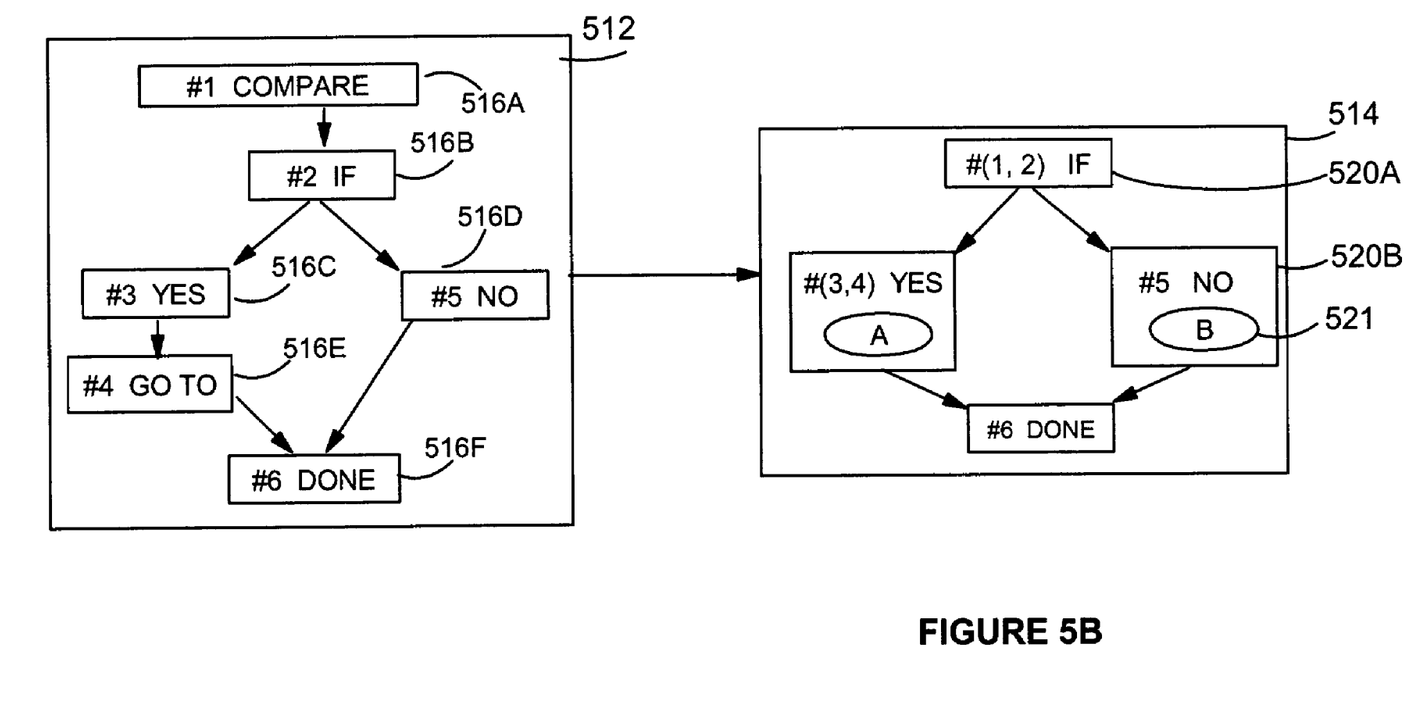

Referring to FIGS. 5A and 5B, there is depicted a first alternative compilation environment 500 using compiler 502 incorporating an embodiment of the invention.

Environment 500 includes compiler 502, source code 504, first pass executable code 506A, and second pass executable code 506B. Source code 504 includes machine-independent code. Executable code 506A and 506B includes machine-dependent code. Block 508 depicts the optimization phases of compiler 502.

In a first compilation pass, compiler 504 reads source code 504, generates intermediate representation (IR) code in block 508A (e.g., phase 1), and populates table 518. Table 518 is mechanism for associating identifiers with instructions as will be explained below. During subsequent compilation phases (e.g., blocks 508B, 508C, 508D), compiler 508 will reorganize the IR code, and insert counters into the IR code as will be explained below. Compiler 502 uses IR code 510D to generate first pass executable code 506A. After the first compilation pass has been completed, code 506A is made to interact with test data (not depicted) in which counter data will be generated as depicted in block 524. Block 522 depicts a consolidation of counter data. During a second compilation pass, compiler 502 reads source code 504, the assignment of identifiers with instructions (from table 518), and counter data 522. Subsequently, counter data is used during initial optimization phases for reorganizing IR code as will be explained below. Compiler 502 completes the second compilation pass by generating code 506B.

Compiler 502 performs a first pass compilation by compiling source code 504 (via several optimization phases) to generate the first pass executable code 506A. During an early optimization phase of the first pass while optimizing code, compiler 502 inserts identifiers (into the optimized code) for identifying specific instructions of the optimized code. During a later or subsequent optimization phase, compiler 502 inserts counters into the optimized code. For subsequent optimization phases, the instructions of the code are changed from machine-independent code to machine-dependent code in which machine-independent instructions will be split or combined into one or more machine-dependent instructions. The machine-dependent instructions can be treated as children of the machine-independent instructions in which the machine-dependent instructions (or code of later optimization phases) will inherit the identifiers associated with the machine-independent instructions (or code of earlier optimization phases).

Once the identifiers and counters have been inserted, compiler 502 generates code 506A. The generated code 506A is executed and it made to interact with test data (not depicted) to generate counter data 524. After the counter data 524 is generated, compiler 502 consolidates the information in data 524 to create data 522 which relates or associates the generated counter data to the identifiers.

Compiler 502 performs a second pass compilation in which the compiler 502 reads source code 504, consolidated counter data 522, table 518 and then performs various optimization phases to generate optimized executable code 506B. During a first or early optimization phase, compiler 502 can take advantage of the counter data to begin immediate preferred or advantageous placement of instructions rather than waiting towards later or last optimization phases for placement of instructions based on collected or generated counter data.

Compiler 502 performs several optimization phases when compiling source code 504. Optimization phases 508 includes, in the exemplary alternate embodiment, four phases of optimization which are depicted as phases 508A, 508B, 508C, and 508D. During optimization phases 508 intermediate representation (IR) code is generated and compiler 502 shuffles or organizes the portions of IR code. The corresponding IR code generated for each optimization phase 508A to 508D inclusive is depicted as IR code 510A to 510D respectively. During the optimization phases of compiler 502, the instructions of code 504 are converted into IR code. It will be appreciated that optimization phases 508 performed by compiler 504 can be incorporated into either high or low level optimizer routines of compilers which are well known by persons having ordinary skill in the art.

At the end of each phase of optimization, the IR code will be organized into a form depicted as IR code 510A to 510D inclusive for respective phases 508A to 508D. Block 512 depicts contents of IR code 510A. Block 514 depicts contents of code 510D. The contents of IR code 510B and 510C are not depicted, but it will be understood that the contents of IR code 510B and 510C will generally be different than the contents of IR code 510A and 510D.

Compiler 502 generates or populates table 518 which is a listing of identifiers assigned to corresponding instructions of IR code 512. Compiler 502 inspects IR code 512 and then assigns ID#s in table 518, and inserts the ID#s into the respective unit of IR code 512. IR code 512 includes instructions 516A to 516F. In code 512, identifiers ID#1 to ID#6 are inserted next to their respectively assigned instructions 516A to 516F. Compiler 502 performs several intermediate or subsequent optimization phases 508B and 508C in which instructions 516A to 516F are changed into smaller or simpler instructions (becoming more and more like assembler code) and the changed code is relocated, reshuffled or reorganized to achieve some sort of optimization or preferred placement of changed code in accordance to methods well known to persons having ordinary skill in the art. Compiler 502 ensures that the changed code inherits the ID#s of its parent code. In an alternative embodiment, counters are inserted source code and the counters are propagated through the IR code.

In an alternative embodiment, the counter and identifier are the same entity that provides the functions of counting and identification. The counter or counters are inserted in an initial or early optimization phase. Code generated for subsequent optimization phases will inherit the counters that were assigned during the initial or early optimization phase.

During a later or subsequent compilation phase, compiler 502 completes optimization phase 508D to generate IR code 510D. The contents of code 510D are shown in code 514. Code 514 includes instructions 520A and 520B. Counters, such as PDF counter 521, are inserted next to changed instructions included in IR code 510D. Optionally, the counters can be inserted next to branch conditions or instructions only. After the counters have been inserted, compiler 502 generates first pass executable code 506A. Executable code 506A is executed and is made to interact with test data (not depicted). As a result of the interaction with the test data, the inserted counters accumulate counts (such as statistical execution data of portions of IR code) indicating the number of times the various portions of code were executed in code 506A when code 506A interacted with the test data.

Block 524 depicts some of the accumulated statistical information of individual counters. The counters are consolidated in block 522 which depicts the values of counters that correspond to the identifiers of table 518. An exemplary counter is a PDF counters known to persons having ordinary skill in the art.

In a second compilation pass, compiler 502 will use the counter data of block 522 to generate second pass optimized executable code 506B by using the counter data 522 to guide the optimization routines of compiler 502 so that the instructions having a numerically higher statistical execution data (such as data indicating high frequency of performance) will be placed contiguously with branching instructions. Also, instructions having lower statistical execution data will be placed offset from branching instructions.

Figure 6:
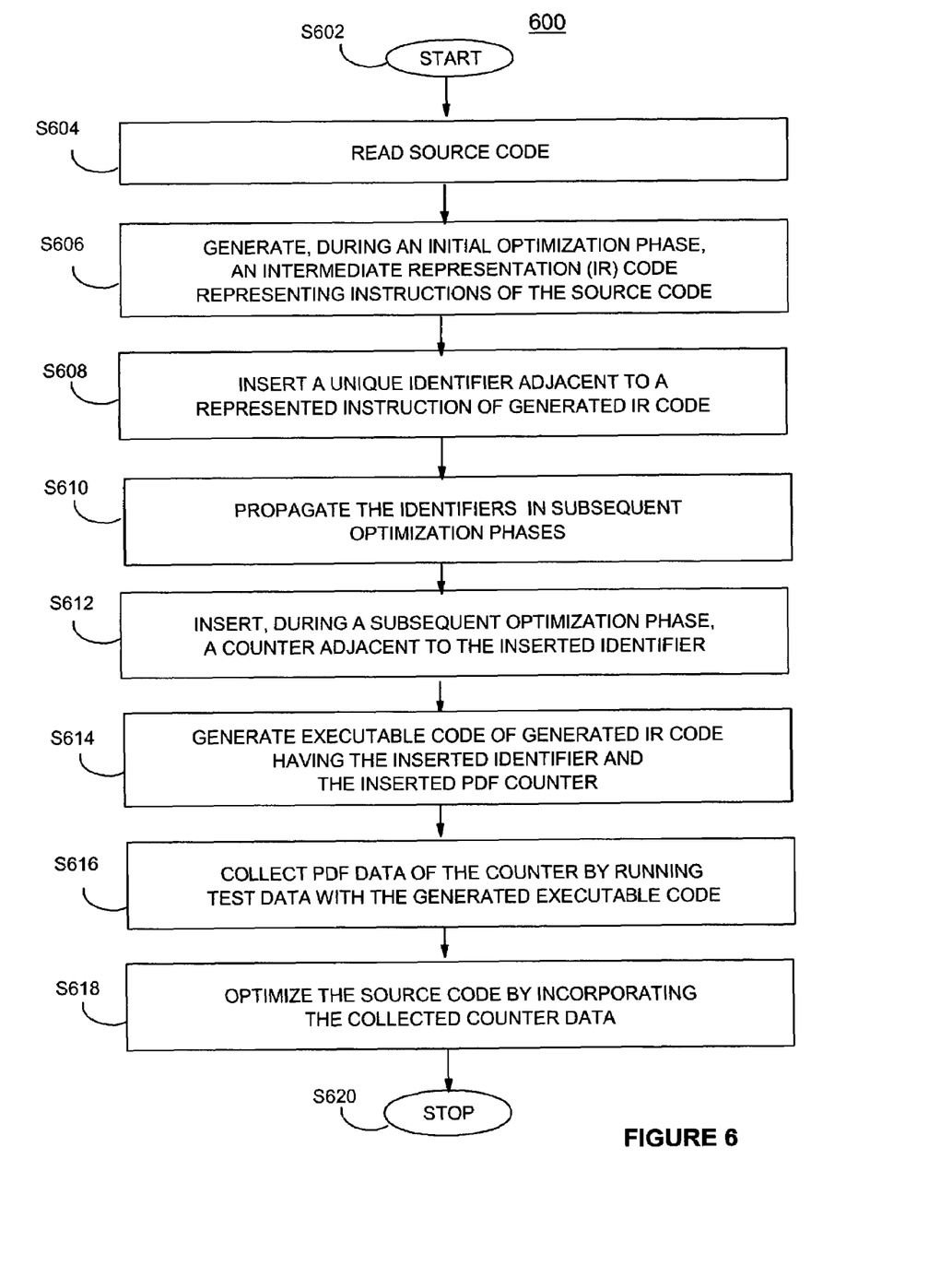
FIG. 6 depicts operations of the compiler of FIG. 5A.

Referring to FIG. 6, there is depicted operations of the compiler 502 of FIG. 5. It is understood that the operations depicted in flowchart 600 are performed by compiler 502 unless otherwise stated. In S602, when compiler 502 is ready, a first pass compilation of compiler 502 begins. In S604, compiler 502 reads source code 504.

In S606, compiler 502 generates, during a first or an initial optimization phase, such as phase 508A, IR code 510A. In S608, compiler 502 generates or populates table 518 and inserts into table 518 identifiers, such as ID#1 to ID#6. The identifiers are assigned to a respective instruction or unit of code in IR code 512. Then the ID#s or identifiers are inserted adjacent to their respective instruction of IR code 512. IR code 512A has instructions 516A to 516F. As illustrated, identifier ID#1 has been assigned to instruction 516A. Similarly, ID#2 to ID#6 have been assigned to instructions 516B to 516F, respectively. Table 518 includes a listing of instructions of IR code and their correspondingly assigned unique identifier. In an alternative embodiment, compiler 502 assigns identifiers to a subset of instructions of code 512, for example the subset of instructions includes only branching instructions.

In S610, compiler 502 changes the instructions of IR code 512 for subsequent optimization phases in an effort to change the machine-independent instructions of code 504 into machine-dependent code of code 506A. Upon completing optimization phase 508A, subsequent optimization phases 510B to 510D will shuffle or organize or optimize portions of IR code in accordance with typical programmed steps inherent to optimization processes known to persons of ordinary skill in the art. The optimization process of reshuffling the instructions in the second optimization phase 510B will also involve combining specific instructions or splitting other specific instructions (in an effort to change machine-independent code into machine-dependent code).

The code that is generated for subsequent optimization phase 510B will inherit the identifiers that were assigned during optimization phase 510A. If, during subsequent optimization phases, an instruction is combined with another instruction to form a single new instruction, then the new instruction will inherit the identifier assigned to the original or parent instructions of phase 510A. For example, if instruction 516A ('COMPARE' instruction) is combined with instruction 516B ('IF' instruction) then a new identifier, such as ID# (1,2), will be assigned to the combined new instruction. The combined new instruction inherits ID#(1,2) which identifies both parent instructions. If an instruction is split into various separate instructions during subsequent optimization phases, then the split instructions will inherit the same identifier as the original or parent instruction. For example, a "COMPARE" instruction is assigned an identifier ID#1. The COMPARE instruction is split into a 'CHECK IF LARGER THAN' instruction and a 'CHECK IF LESS THAN' instruction. The instructions 'CHECK IF LARGER THAN' and 'CHECK IF LESS THAN' will inherit identifier ID#1 of the parent instruction 'COMPARE'. The inheritance process is performed for each subsequent optimization phase of phases 508. Inheritance of the identifiers by subsequently created IR code of an optimization phase improves the ability of the compiler 502 to predict execution flow through of branching instructions by relating the counter data back to the instruction identified in the initial or early optimization phase. It will be appreciated that the manner of propagation of the identifiers can be adapted or modified by persons having ordinary skill in the art to achieve various results.

In the preferred embodiment, compiler 502 inserts a counter 521 adjacent to an inserted identifier of instruction 520B during a later optimization phase 508D (S612). The counter can be a PDF counter which is well known or can be other types of counters suitable for the purposes of S612. Typically, PDF counters are inserted into specific physical positions in the IR code generated in the last or later optimization phase, which is depicted in optimization phase 510D. The generated IR code of the last optimization phase will have inserted identifiers and inserted counters. In S614, compiler 502 generates executable code 506A corresponding to generated IR code 510D. After the first compilation pass has been completed, the executable code is made to interact with test data so that the inserted counters can collect counter values each time a branch instruction is executed.

In S616, the counters count the frequency of execution of portions of executable code 506A when test data is made to interact with the executable code 506A. Block 524 depicts counters having exemplary collected data indicating frequency of execution of specific branch instructions and identifies the instructions associated with the branches. Since data 524 indicates the frequency of execution of individual identifiers, counters of data 524 will be consolidated to form data 522 having consolidated final counts corresponding to the inserted identifiers. For example, data 524 includes counter data of counter A which is the count (of the frequency of execution) for an instruction having an identification inherited from combining two separate identifiers (namely from both ID#3 and ID#4). Data 524 includes counter data of counter B which is the count for an instruction having an identification inherited from ID#5. The counter data contained in data 524 is consolidated in data 522. For example: counts for ID#3 are totaled (e.g., all counters that counted ID#3 are tallied into a final count for ID#3) and a single count for ID#3 is shown in data 522.

In S618, a second compilation pass of compiler 502, compiler 502 optimizes the IR code (such as shuffling the code during the optimization phases) by reading the consolidated data 522 (to obtain an understanding of the frequency of execution of various branching conditions) and referring to table 518 as needed to match identifiers to specific instructions in code 512. Then with the statistical execution data contained in data 522, compiler 502 shuffles or optimizes the instructions or portions of IR code in phase 510A. The identifiers of table 518 refer to instructions identified during the initial optimization phase. Advantageously, the IR code can be shuffled or relocated in the first phase 510A (or early optimization phase) rather than waiting to shuffle the IR code at later phases of optimization. In S620, operation of compiler 502 stops. As a result of the foregoing, persons of ordinary skill in the art will appreciate that the exemplary alternative provides for code which can be optimized sooner rather than later during the optimization phases of compiler 502.

Referring to FIG. 7, there is depicted a second alternative compilation environment 700 using compiler 708 incorporating an embodiment of the invention. Initially, compilation environment 700 includes source code 702, compiler 708, assembler code 706, and test data 714. Assembler code 706 includes assembler instructions 710A to 710G. Compiler 708 compiles source code 702 (and compiler 708 performs various optimization phases) to generate assembler code 706 and then executable code 712 for a first pass compilation pass. During an initial optimization phase of compiler 708, compiler 708 generates or populates table 704 having identifiers ID#1, ID#2, ID#3, and ID#4 assigned to corresponding source instructions of source code 702.

Source code 702 includes a conditional branch instruction (BRANCH TO 'DONE' IF B=0) and a memory access instruction (LOAD A). The memory access instruction requires a CPU to accesses computer memory when the branch instruction is conditionally 'false'; otherwise, when the branch instruction is conditionally 'true' then the memory access instruction is not performed. Accessing data from memory involves shuffling data between computer memory and a hardware register of the CPU, which requires a significant amount of CPU time to perform.

Some optimization algorithms allow the use of recovery code. Recovery code is not user insertable code but rather is code that is managed by the optimization algorithm of compiler 708. For the case when compiler 708 can determine whether the memory access instruction is used frequently or infrequently, then recovery code can be inserted by compiler 708 in response to the frequency of usage of memory access instructions. An example of recovery code are instructions 710C, 710F and 710G of assembler code 710. If a memory access instruction were to be executed infrequently then in assembler code 706 the memory access instruction is not relocated. However, if the memory access instruction were to be executed very frequently then it would be preferred to rearrange the instructions so that instruction 'LOAD A' is used before commencing the conditional branch state (depicted as instruction 710B). A frequency threshold could be established for determining an appropriate level of frequency of memory access which, when enabled, would result in the rearrangement described above.

Compiler 708 inserts the identifiers of table 704 into intermediate code of an initial optimization phase (not depicted). Then during subsequent optimization phases as the instructions are reorganized, combined, or split, the subsequently optimized code inherits the identifiers of the parent code. When instructions are combined or split into several other instructions during various subsequent optimization phases, then the newly created instructions will inherit the identification of their parent instructions from previous optimization phases.

Instructions 710A to 710G are depicted as having inherited ID#s. Code 706 shows the identifiers (ID#s) assigned to the instructions 710A to 710G as a result of propagating the ID#s through subsequent optimization phases. Counters are also shown inserted into code 706 during a final or later optimization phase (not depicted).

Also shown in code 706 are instructions 710C, 710F, 710G, which were inserted by compiler 708. Compiler 708 transforms code 710 to generate executable code 712 as a result of compiler 708 completing its first compilation pass. Code 712 is made to interact with test data 714 to generate counter values for the ID#s as shown in data 716. In a second compilation pass, compiler 708 will refer to table 704 and data 716 when compiling source code 702 to generate optimized executable code 720.

Figure 8:
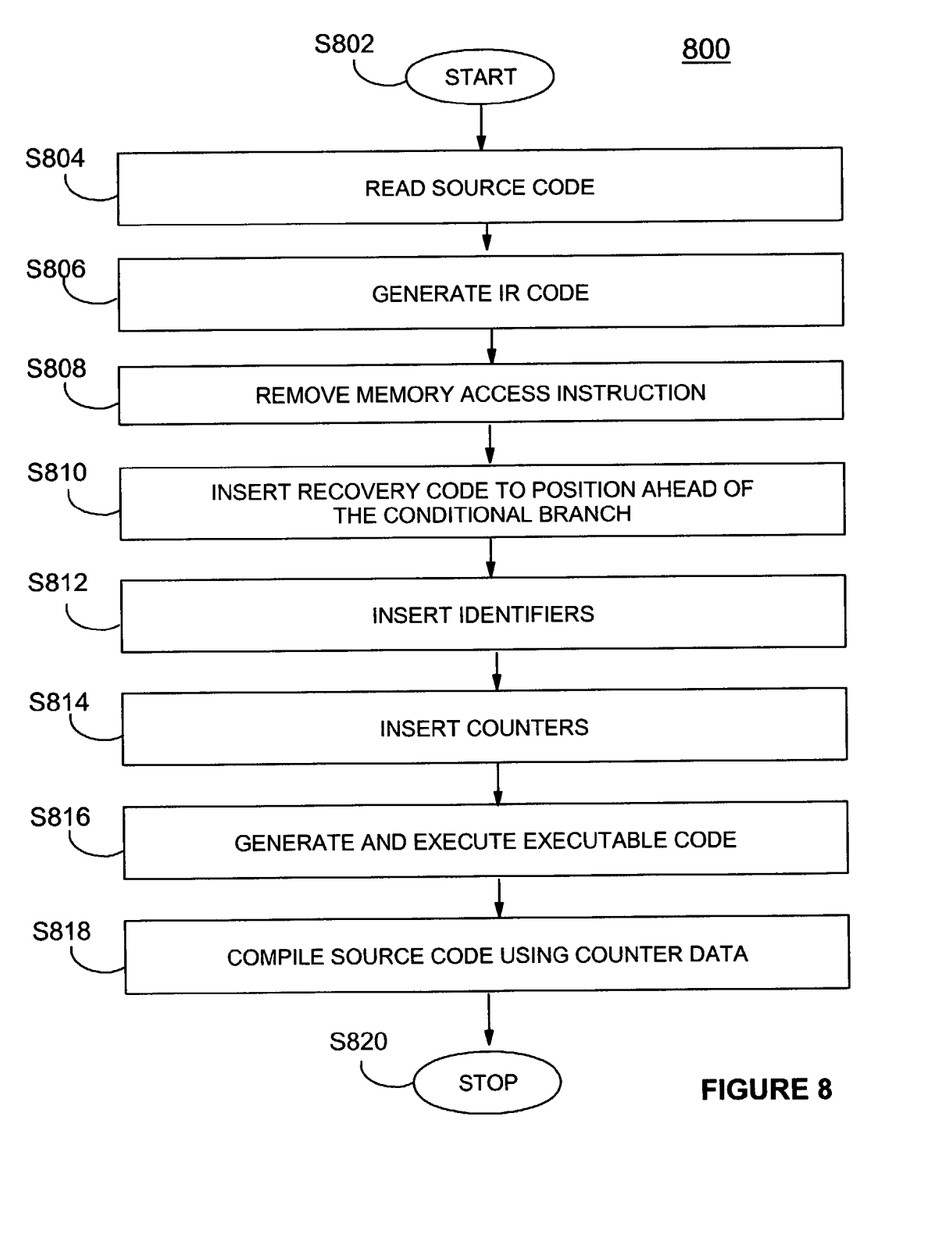
FIG. 8 depicts operations of the compiler of FIG. 7.

Referring to FIG. 8, there is depicted operations of the compiler 708 FIG. 7. It is understood that the operations depicted in flowchart 800 are performed by compiler 708 unless otherwise stated.

The recovery instructions 710A, 710C, 710F, 710G relate to the Intel ItaniumJ processor manufactured by the Intel Corporation of California. When compiler 708 is ready, S802 indicates the start of operations. In S804, compiler 708 reads source code 702. During a first compilation pass, in S806, compiler 708 generates IR code (not depicted) of source code 702. In S808, compiler 708 inserts unique identifiers for each instruction of the generated IR code. Block 710 includes instructions 710A to 710G each being identified by the inserted identifiers.

In S810, compiler 708 removes the memory access instruction "LOAD A" and inserts recovery code "LOAD.S A" in place of the removed memory access instruction into a position ahead of the conditional branch instruction. The 'load from memory' instruction is to be performed before entry into a 'conditional branch' instruction. Compiler 708 will presume that accessing memory is a task that will be performed frequently when code 712 is executed. If the memory was not accessed by instruction "LOAD.S A", then the remaining recovery code 710C, 710F, and 710G perform a 'recovery' by accessing memory because instruction 710A failed to be performed. It will be appreciated that the executable code 712 will be interacting with test data 714 to generate counter data 716. From the counter data, compiler 708 will be ascertain whether the recovery code was actually beneficial, as will be discussed below.

In S812, compiler 708 inserts remaining recovery instructions 710C, 710F and 710G. Instruction 710C depicts logic for checking that variable 'A' has a valid value to make sure that LOAD.S had indeed worked and memory was accessed. If an exception was generated by the LOAD.S A code of instruction 710A, then the logic will branch to RECOVERY in instruction 710F. Instructions 710C, 710F, 710G were not generated compiler 700 and subsequently inserted into IR code during an initial optimization phase before the assignment of the identifiers. Instructions are generated by compiler 708 during an optimization phase in which instruction 'LOAD A' was removed by the compiler from a position after the conditional branch to a position before the conditional branch. As a result of assigning ID#s to each instruction in a first optimization phase of compiler 708, each instruction has an associated ID#.

In S814, compiler 708 inserts counters into the IR code. In S816, compiler 708 generates and executes executable code 712. Counter data 716 is generated when executable code interacts with test data 714. The results indicated in data 716 indicate that accessing of memory occurs frequently and that the code (especially the recovery code) depicted in block 706 is in fact very desirable. If other counter results were achieved, such that the count for ID#1=4 and the count for ID#2=1, then that would indicate that memory accesses are less frequent and the code depicted in block 706 is not desirable (so that the recovery instructions should not be used).

In S818, compiler 708 compiles source code 702 by using consolidated counter data in a second compilation pass to generate optimized executable code that may or may not have the recovery instruction included, depending on whether data 716 is obtained. In S820, compiler 708 stops the process of compilation.

An advantage provided by the invention is that a compiler can use captured counter data to achieve placement of machine-independent code early in the optimization phases rather than achieve code placement during later optimization phases. Another advantage provided by the invention is that the relocation (optimization) of code can occur during an early optimization phase based on statistical execution data of the instructions which are related to the machine-independent code.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The embodiments of the invention in which an exclusive property or privilege is claimed are defined as follows:

1. A method for compiling machine-independent code to generate statistically optimized machine-dependent, executable code, said machine-independent code comprising a machine-independent code instruction, said method comprising:
    maintaining data specifying a mapping between an instruction identifier and said machine-independent code instruction;
    compiling said machine-independent code into intermediate code, wherein said compiling comprises compiling said machine-independent code instruction into an intermediate representation instruction;
    associating said instruction identifier with said intermediate representation instruction utilizing said data specifying said mapping;
    associating an instruction frequency counter with said intermediate representation instruction;
    generating statistical execution data utilizing said instruction frequency counter; and
    optimizing a subsequent compilation of said machine-independent code based on said statistical execution data.

2. The method of claim 1 further comprising:
    identifying said machine-independent code instruction utilizing said instruction identifier;
    executing said machine-dependent, executable code in response to said optimizing; and
    collecting said statistical execution data for said machine-independent code instruction in response to said executing.

3. The method of claim 2, wherein:
    said machine-independent code instruction comprises a high-level programming language instruction,
    said intermediate representation instruction comprises a low-level programming language instruction; and
    said machine-dependent, executable code comprises statistically optimized object code executable by a computer system.

4. The method of claim 3 wherein,
    said machine-independent code instruction comprises a first machine-independent code instruction,
    said instruction identifier comprises a first instruction identifier,
    said compiling comprises at least one of:
        generating a plurality intermediate representation instructions utilizing said first machine-independent code instruction; and
        generating a single combined intermediate representation instruction utilizing said first machine-independent code instruction and a second machine-independent code instruction which is associated with a second instruction identifier; and
    said associating comprises at least one of:
        associating said first instruction identifier with each of said plurality intermediate representation instructions; and
        associating a third instruction identifier with said single combined intermediate representation instruction, wherein said third instruction identifier comprises data specifying said first instruction identifier and said second instruction identifier.

5. The method of claim 3 wherein associating said instruction identifier with said intermediate representation instruction comprises inserting data specifying said instruction identifier adjacent to said intermediate representation instruction.

6. The method of claim 5 wherein associating an instruction frequency counter with said intermediate representation instruction comprises inserting a profile directed feedback counter adjacent to intermediate representation instruction.

7. The method of claim 6 wherein:
    said statistical execution data is generated while said machine-dependent, executable code interacts with test data.

8. The method of claim 1 wherein said method is performed by a single optimizing compiler.

9. A machine-readable storage medium having a plurality of instructions executable by a machine embodied therein, wherein said plurality of instructions, when executed, cause said machine to perform a method for compiling machine-independent code to generate statistically optimized machine-dependent, executable code, said machine-independent code comprising a machine-independent code instruction, said method comprising:
    maintaining data specifying a mapping between an instruction identifier and said machine-independent code instruction;
    compiling said machine-independent code into intermediate code, wherein said compiling comprises compiling said machine-independent code instruction into an intermediate representation instruction;
    associating said instruction identifier with said intermediate representation instruction utilizing said data specifying said mapping;
    associating an instruction frequency counter with said intermediate representation instruction;
    generating statistical execution data utilizing said instruction frequency counter; and optimizing a subsequent compilation of said machine-independent code based on said statistical execution data.

10. The machine readable storage medium of claim 9 further comprising:
identifying said machine-independent code instruction utilizing said instruction identifier;
executing said machine-dependent, executable code in response to said optimizing; and
collecting said statistical execution data for said machine-independent code instruction in response to said executing.

11. The machine readable storage medium of claim 10, wherein:
said machine-independent code instruction comprises a high-level programming language instruction,
said intermediate representation instruction comprises a low-level programming language instruction; and
said machine-dependent, executable code comprises statistically optimized object code executable by a computer system.

12. The machine readable storage medium of claim 11 wherein,
said machine-independent code instruction comprises a first machine-independent code instruction,
said instruction identifier comprises a first instruction identifier,
said compiling comprises at least one of:
generating a plurality intermediate representation instructions utilizing said first machine-independent code instruction; and
generating a single combined intermediate representation instruction utilizing said first machine-independent code instruction and a second machine-independent code instruction which is associated with a second instruction identifier; and
said associating comprises at least one of:
associating said first instruction identifier with each of said plurality intermediate representation instructions; and
associating a third instruction identifier with said single combined intermediate representation instruction, wherein said third instruction identifier comprises data specifying said first instruction identifier and said second instruction identifier.

13. The machine readable storage medium of claim 11 wherein associating said instruction identifier with said intermediate representation instruction comprises inserting data specifying said instruction identifier adjacent to said intermediate representation instruction.

14. The machine readable storage medium of claim 13 wherein associating an instruction frequency counter with said intermediate representation instruction comprises inserting a profile directed feedback counter adjacent to intermediate representation instruction.

15. The machine readable storage medium of claim 14 wherein:
said statistical execution data is generated while said machine-dependent, executable code interacts with test data.

16. The machine readable storage medium of claim 9 wherein said method is performed by a single optimizing compiler.

17. An apparatus capable of compiling machine-independent code to generate statistically optimized machine-dependent, executable code, said machine-independent code comprising a machine-independent code instruction, said apparatus comprising:
means for maintaining data specifying a mapping between an instruction identifier and said machine-independent code instruction;
means for compiling said machine-independent code into intermediate code, wherein said means for compiling comprises means for compiling said machine-independent code instruction into an intermediate representation instruction;
means for associating said instruction identifier with said intermediate representation instruction utilizing said data specifying said mapping;
means for associating an instruction frequency counter with said intermediate representation instruction;
means for generating statistical execution data utilizing said instruction frequency counter; and
means for optimizing a subsequent compilation of said machine-independent code based on said statistical execution data.

18. The apparatus of claim 17 further comprising: means for identifying said machine-independent code instruction utilizing said instruction identifier;
means for executing said machine-dependent, executable code in response to said an optimization of said subsequent compilation; and
means for collecting said statistical execution data for said machine-independent code instruction in response to an execution of said machine-dependent, executable code.

19. The apparatus of claim 18, wherein:
said machine-independent code instruction comprises a high-level programming language instruction,
said intermediate representation instruction comprises a low-level programming language instruction; and
said machine-dependent, executable code comprises statistically optimized object code executable by a computer system.

20. The apparatus of claim 19 wherein,
said machine-independent code instruction comprises a first machine-independent code instruction,
said instruction identifier comprises a first instruction identifier,
said means for compiling comprises at least one of:
means for generating a plurality intermediate representation instructions utilizing said first machine-independent code instruction; and
means for generating a single combined intermediate representation instruction utilizing said first machine-independent code instruction and a second machine-independent code instruction which is associated with a second instruction identifier; and
said means for associating comprises at least one of:
means for associating said first instruction identifier with each of said plurality intermediate representation instructions; and
means for associating a third instruction identifier with said single combined intermediate representation instruction, wherein said third instruction identifier comprises data specifying said first instruction identifier and said second instruction identifier.

* * * * *